(12) United States Patent
You et al.

(10) Patent No.: US 11,914,720 B2
(45) Date of Patent: Feb. 27, 2024

(54) METHOD FOR VERIFYING DRONE INCLUDED IN INDUSTRIAL INTERNET OF THINGS SYSTEM, BY USING PETRI-NET MODELING

(71) Applicant: SOONCHUNHYANG UNIVERSITY INDUSTRY ACADEMY COOPERATION FOUNDATION, Asan-si (KR)

(72) Inventors: Il Sun You, Asan-Si (KR); Vishal Sharma, Asan-Si (KR); Gaurav Choudhary, Asan-Si (KR); Yong Ho Ko, Asan-Si (KR)

(73) Assignee: SOONCHUNHYANG UNIVERSITY INDUSTRY ACADEMY COOPERATION FOUNDATION, Asan-si (KR)

( * ) Notice: Subject to any disclaimer, the term of this patent is extended or adjusted under 35 U.S.C. 154(b) by 481 days.

(21) Appl. No.: 17/255,497

(22) PCT Filed: May 9, 2019

(86) PCT No.: PCT/KR2019/095005
§ 371 (c)(1),
(2) Date: Dec. 23, 2020

(87) PCT Pub. No.: WO2020/005048
PCT Pub. Date: Jan. 2, 2020

(65) Prior Publication Data
US 2021/0279339 A1    Sep. 9, 2021

(30) Foreign Application Priority Data
Jun. 29, 2018 (KR) .......................... 10-2018-0075812

(51) Int. Cl.
*G06F 21/57* (2013.01)
*G06N 7/00* (2023.01)
(Continued)

(52) U.S. Cl.
CPC ............. *G06F 21/577* (2013.01); *G06N 7/00* (2013.01); *H04L 63/08* (2013.01); *H04L 67/12* (2013.01)

(58) Field of Classification Search
None
See application file for complete search history.

(56) References Cited

U.S. PATENT DOCUMENTS 4,644,461 A * 2/1987 Jennings ........... G06F 15/17375
712/18
4,930,102 A * 5/1990 Jennings ............... G06F 9/4494
711/125

(Continued)

FOREIGN PATENT DOCUMENTS

KR    10-2004-0087206 A    10/2004
KR    10-2010-0098141 A    9/2010
KR    10-2017-0110796 A    10/2017

OTHER PUBLICATIONS

Rold'an et al.; A proposal of methodology for multi-UAV mission modeling; 2015 23rd Mediterranean Conference on Control and Automation (MED) (Year: 2015).*

(Continued)

*Primary Examiner* — Kambiz Zand
*Assistant Examiner* — Mahabub S Ahmed
(74) *Attorney, Agent, or Firm* — Sughrue Mion, PLLC (57) ABSTRACT

A method for verifying a drone included in an industrial Internet of Things (IIoT) system, using a petri-net modeling is disclosed. In an embodiment, the method includes a step of modeling the IIoT system as a hierarchical petri-net (Continued)

(modeling step); and a step of verifying whether the drone has security vulnerability on the basis of the hierarchical petri-net model (verification step), wherein the verification step can determine that a drone has security vulnerability when at least one of a plurality of determination factors provided as places to the hierarchical petri-net model determines that the drone is operating abnormally.

5 Claims, 5 Drawing Sheets

(51) Int. Cl.
*H04L 9/40* (2022.01)
*H04L 67/12* (2022.01)

(56) References Cited

U.S. PATENT DOCUMENTS

| | | | | |
|---|---|---|---|---|
| 8,572,733 | B1* | 10/2013 | Rockwood | H04L 63/1433 709/224 |
| 10,673,880 | B1* | 6/2020 | Pratt | H04L 63/1433 |
| 10,764,319 | B2* | 9/2020 | Dhakshinamoorthy | H04L 63/1466 |
| 10,791,063 | B1* | 9/2020 | Florissi | H04L 47/783 |
| 10,860,622 | B1* | 12/2020 | Florissi | G06F 16/22 |
| 11,182,598 | B2* | 11/2021 | Sriram | G06V 40/20 |
| 11,315,428 | B2* | 4/2022 | Akiyama | G08G 1/0141 |
| 11,386,785 | B2* | 7/2022 | Hosokawa | G05D 1/0238 |
| 11,565,695 | B2* | 1/2023 | Slusar | B60W 30/143 |
| 2007/0016464 | A1* | 1/2007 | Yen | G06Q 90/00 705/301 |
| 2009/0271131 | A1* | 10/2009 | Ashton | H04L 67/12 702/57 |
| 2010/0163621 | A1* | 7/2010 | Ben-Asher | G05D 1/104 235/412 |
| 2012/0032025 | A1* | 2/2012 | Allen | B64F 1/025 244/110 C |
| 2016/0381596 | A1* | 12/2016 | Hu | H04W 28/0268 370/236 |
| 2018/0048669 | A1* | 2/2018 | Lokamathe | G06N 5/04 |
| 2018/0202819 | A1* | 7/2018 | Mital | G06N 3/08 |
| 2019/0034920 | A1* | 1/2019 | Nolan | H04L 9/50 |
| 2021/0084012 | A1* | 3/2021 | Victor | H04L 63/0263 |
| 2022/0083655 | A1* | 3/2022 | Yang | G06F 21/577 |

OTHER PUBLICATIONS

Gribaudo1 et al.; An IoT-basedmonitoring approach for cultural heritage sites: The Matera case; wileyonlinelibrary.com/journal/cpe (Year: 2016).*
Wu, wt al.; An Attack Modeling Based on Hierarchical Colored Petri Nets; 2008 International Conference on Computer and Electrical Engineering (Year: 2008).*
Roldan, et al.; Determining mission evolution through UAV telemetry by using decision trees; 2016 IEEE International Conference on Systems, Man, and Cybernetics 'SMC 20161 Oct. 9-12, 2016' Budapest, Hungary (Year: 2016).*
Calderaro, et al.; Failure Identification in Smart Grids Based on Petri Net Modeling; IEEE Transactions on Industrial Electronics, vol. 58, No. 10, Oct. 2011 (Year: 2011).*
Yu et al.; Formal modeling and control of cyber-physical manufacturing systems; from scholar.google.com (Year: 2017).*
Zhou et al.; Fuzzy Petri nets and industrial applications: a review; springer (Year: 2016).*
Martínez et al.; Modelling and Fault Diagnosis by Means of Petri Nets. Unmanned Aerial Vehicle Application; from scholar.google. com (Year: 2014).*
Wang, et al; Petri Net Based Modeling Approach for Fault Affected UAV Subsystems Reconfiguration; AIAA 1st Intelligent Systems Technical Conference (Year: 2004).*
Yang et al.; Petri Net Based Safety Evaluation Approach for Aircraft under the threats of Traditional Weapons; 2011 Third International Conference on Measuring Technology and Mechatronics Automation (Year: 2011).*
Sharma, et al.; Secure and Efficient Context-Aware Localization of Drones in Urban Scenarios; IEEE Communications Magazine • Apr. 2018 (Year: 2018).*
Skormin et al.; The Behavioral Approach to Diagnostics of Cyber-Physical Systems; IEEE (Year: 2014).*
Xu et al.; Threat-Driven Modeling and Verification of Secure Software Using Aspect-Oriented Petri Nets; IEEE (Year: 2006).*
Gonçalves et al.; Unmanned aerial vehicle safety assessment modelling through petri Nets; http://dx.doi.org/10.1016/j.ress.2017.06. 021 (Year: 2017).*
Dianxiang Xu et al., "Threat-Driven Modeling and Verification of Secure Software Using Aspect-Oriented Petri Nets", IEEE Transactions on Software Engineering, Apr. 2006, 265-278, vol. 32, No. 4.
Vishal Sharma et al., "Secure and Efficient Context-Aware Localization of Drones in Urban Scenarios", IEEE Communications Magazine, Apr. 2018, pp. 120-128, vol. 56, No. 4.
International Searching Authority, International Search Report for PCT/KR2019/095005 dated, Aug. 13, 2019 (PCT/ISA/210).

* cited by examiner

METHOD FOR VERIFYING DRONE INCLUDED IN INDUSTRIAL INTERNET OF THINGS SYSTEM, BY USING PETRI-NET MODELING

CROSS REFERENCE TO RELATED APPLICATIONS

This application is a National Stage of International Application No. PCT/KR2019/095005 filed May 9, 2019, claiming priority based on Korean Patent Application No. 10-2018-0075812 filed Jun. 29, 2018.

BACKGROUND OF THE DISCLOSURE

Field of the Disclosure

Embodiments relate to a method of verifying a drone included in an industrial Internet of things (IIoT) system using petri net modeling.

Related Art

Contents described in this part merely provide background information on embodiments and do not constitute a conventional technology.

As the use and research of the Internet of things (IoT) continue to increase, research and development of an industrial Internet of things (IIoT) system using the IoT for the industry are actively performed.

In the IIoT system, an unmanned aircraft, that is, a drone, may be used as one component of communication means. The reason for this is that the drone can flexibly handle a situation and a communication environment because it can be easily moved and can widely secure stable communication systems through the investment of small expenses and efforts.

However, since the drone flies as an independent entity, there is a concern that the drone may have a bad influence on an operation of the IIoT system because the drone behaves out of a preset method.

Accordingly, it is necessary to easily and accurately verify whether the drone behaves according to a preset method or behaves out of the preset method.

SUMMARY

Accordingly, an embodiment relates to a method of verifying a drone included in an industrial Internet of things (IIoT) system using petri net modeling, which can accurately and easily verify whether security vulnerability is present.

A technical object to be achieved in an embodiment is not limited to the aforementioned technical object, and other technical objects not described above may be evidently understood by a person having ordinary skill in the art to which the present disclosure pertains from the following description.

An embodiment of a method of verifying a drone is a method of verifying a drone included in an industrial Internet of things (IIoT) system using petri net modeling, including a modeling step of modeling the industrial Internet of things system into a hierarchical type petri net and a verification step of verifying whether security vulnerability is present in the drone based on a hierarchical type petri net model. The verification step may include determining that the security vulnerability is present in the drone when at least one of a plurality of determination factors included as places in the hierarchical type petri net model determines an operation of the drone to be abnormal.

The plurality of determination factors may include a first place for determining whether communication or an operation of the drone is hindered from the outside; a second place for determining whether a waypoint on a moving path in which the drone has been set is altered; a third place for determining whether a plurality of the drones forms enforced clustering that has not been set; a fourth place for determining whether the drone has been captured; a fifth place for determining whether access control over the drone is possible; and a sixth place for determining whether the drone has been authorized by the industrial Internet of things system.

The plurality of determination factors may determine an operation of the drone to be abnormal in at least one of cases where communication or the operation of the drone is hindered from the outside, the waypoint on the moving path in which the drone has been set is altered, the plurality of drones forms enforced clustering that has not been set, the drone has been captured, access control over the drone is impossible, and the drone has not been authorized by the industrial Internet of things system.

The industrial Internet of things system may include a user terminal supporting a user; a first access point connected to the user terminal; a core connected to the first access point and interconnecting the user and an Internet of Thing apparatus; a drone connected to the core in a way to communicate with the core and provided in plural; a second access point connected to the drone; a first Internet of Thing apparatus connected to the second access point and provided to be capable of bidirectional communication with the user; and a second Internet of Thing apparatus connected to the first Internet of Thing apparatus. The hierarchical type petri net model may include a first layer provided as a petri net modeled from the user terminal; a second layer provided as a petri net modeled from the first access point; a third layer provided as a petri net modeled from the core; a fourth layer provided as a petri net modeled from the drone; a fifth layer provided as a petri net modeled from the second access point; a sixth layer provided as a petri net modeled from the first Internet of Thing apparatus; and a seventh layer provided as a petri net modeled from the second Internet of Thing apparatus.

Layers adjacent to each other in the first layer to the seventh layer may be interconnected by at least one transition.

Petri nets constituting the first layer to the seventh layer, respectively, may be bidirectionally connected based on at least one transition between adjacent petri nets.

In an embodiment, there is an effect in that whether security vulnerability is present in a drone included in an industrial Internet of things system can be accurately and easily verified using a hierarchical petri net model.

If the hierarchical petri net model according to an embodiment is used, there are effects in that overhead occurring in verifying a drone can be reduced and thus resource waste and cost waste of a system attributable to excessive overhead can be reduced.

DESCRIPTION OF EXEMPLARY EMBODIMENTS

Hereinafter, embodiments are described in detail with reference to the accompanying drawings. The embodiments may be altered in various ways and may have various forms. Specific embodiments are illustrated in the drawings and are described in detail in the context. It is however to be understood that the embodiments are not intended to be limited to a specific disclosure form and the embodiments include all changes, equivalents and substitutions which fall within the spirit and technological scope of the embodiments.

Terms, such as "a first" and "a second", may be used to describe various components, but the components should not be restricted by the terms. The terms are used to only distinguish one component from the other component. Furthermore, terms specifically defined by taking into consideration a configuration and operation of an embodiment are merely for illustrating the embodiment and do not limit the scope of the embodiment.

In describing an embodiment, if one element is described as being formed "on (over) or beneath (under)" the other element, the term "on (over) or beneath (under)" includes both cases where the two elements come into direct contact with each other or one or more other elements are indirectly disposed between the two elements. Furthermore, if the term "on (over) or beneath (under)" is expressed, it may also include the meaning of a downward direction based on one element in addition to an upward direction.

Furthermore, relational terms, such as "on/above/over" and "beneath/below/under" used hereunder may be used to distinguish any one substance or element from another substance or element while not essentially requiring or including any physical or logical relation or sequence between such substances or elements.

In an embodiment, for convenience of description, a drone 140 may be referred to as an unmanned aircraft, a drone or an unmanned aerial vehicle (UAV), if necessary.

Figure 1:
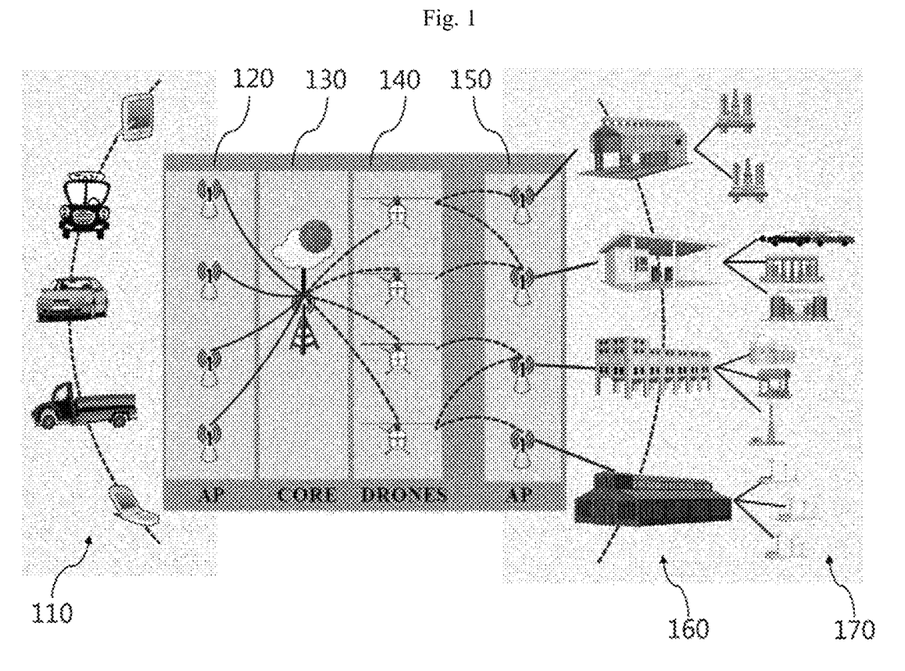
FIG. 1 is a diagram for describing a configuration of an industrial Internet of things system according to an embodiment.

FIG. 1 is a diagram for describing a configuration of an industrial Internet of things system according to an embodiment. The industrial Internet of things system according to an embodiment may include a user terminal 110, a first access point 120, a core 130, a drone 140, a second access point 150, a first Internet of Thing apparatus 160 and a second Internet of Thing apparatus 170. In an embodiment, the user terminal 110, the first Internet of Thing apparatus 160, and the second Internet of Thing apparatus 170 may communicate with each other directly or indirectly. Such communication may be implemented as mobile edge computing (MEC), for example.

The user terminal 110 can communicate with another device and supports a user, and may be configured as a mobile device or a computer, for example, but is not limited thereto. The user terminal 110 may be independently provided, and may also be mounted on a vehicle, etc.

Through the user terminal 110, a user may perform bidirectional communication with the first Internet of Thing apparatus 160 or the second Internet of Thing apparatus 170, and may remotely observe or control the first IoT apparatus 160 or the second Internet of Thing apparatus 170.

The first access point (AP) 120 is connected to the user terminal 110 and is also connected to the core 130, and may support a connection that enables bidirectional communication between the user terminal 110 and the core 130. The first access point 120 may be provided as various communication means, and more properly may be provided as wireless communication means.

The core 130 is connected to the first access point 120, and may connect the user and the Internet of Thing (IoT) apparatus. That is, the user terminal 110 and the first Internet of Thing apparatus 160 may perform bidirectional communication with each other on the basis of the core 130. Accordingly, the core 130 enables stable communication between the user terminal 110 and the first Internet of Thing apparatus 160. The core 130 may be a communication system operated by a communication service company having a base station, for example.

The drone 140 is connected to the core 130 in a way to enable communication, and may be provided in plural. The drone 140 is communication means that supports smooth communication between the core 130 and the second access point 150 and can easily move its location. Accordingly, when a communication problem occurs, the drone may move its location in order to maintain a smooth connection between the core 130 and the second access point 150.

For a smooth communication connection, the drone 140 may be provided in plural, and the drones 140 share given areas. Accordingly, an area capable of communication between the core 130 and the second access point 150 can be effectively expanded.

The second access point 150 is connected to the drone 140, is connected to the first Internet of Thing apparatus 160, and can support a connection that enables bidirectional communication between the drone 140 and the first Internet of Thing apparatus 160. As in the first access point 120, the second access point 150 may be provided as various communication means and more properly may be provided as wireless communication means.

The first Internet of Thing apparatus 160 is connected to the second access point 150, and may be provided to be capable of bidirectional communication with the user. The first Internet of Thing apparatus 160 is connected to the user terminal 110, and may be an apparatus that transmits its own information to the user terminal 110 or that is controlled by the user terminal 110. The first Internet of Thing apparatus 160 may be a large-sized facility, such as a gas station or an electric vehicle charging facility.

The second Internet of Thing apparatus 170 may be connected to the first Internet of Thing apparatus 160 in a way to enable communication. The second Internet of Thing apparatus 170 may be an apparatus which is not directly connected to the second access point 150, but is indirectly connected to the second access point 150 through the first Internet of Thing apparatus 160, such as a gas station apparatus provided in a gas station or a charger provided in an electric vehicle charging facility.

Figure 2:
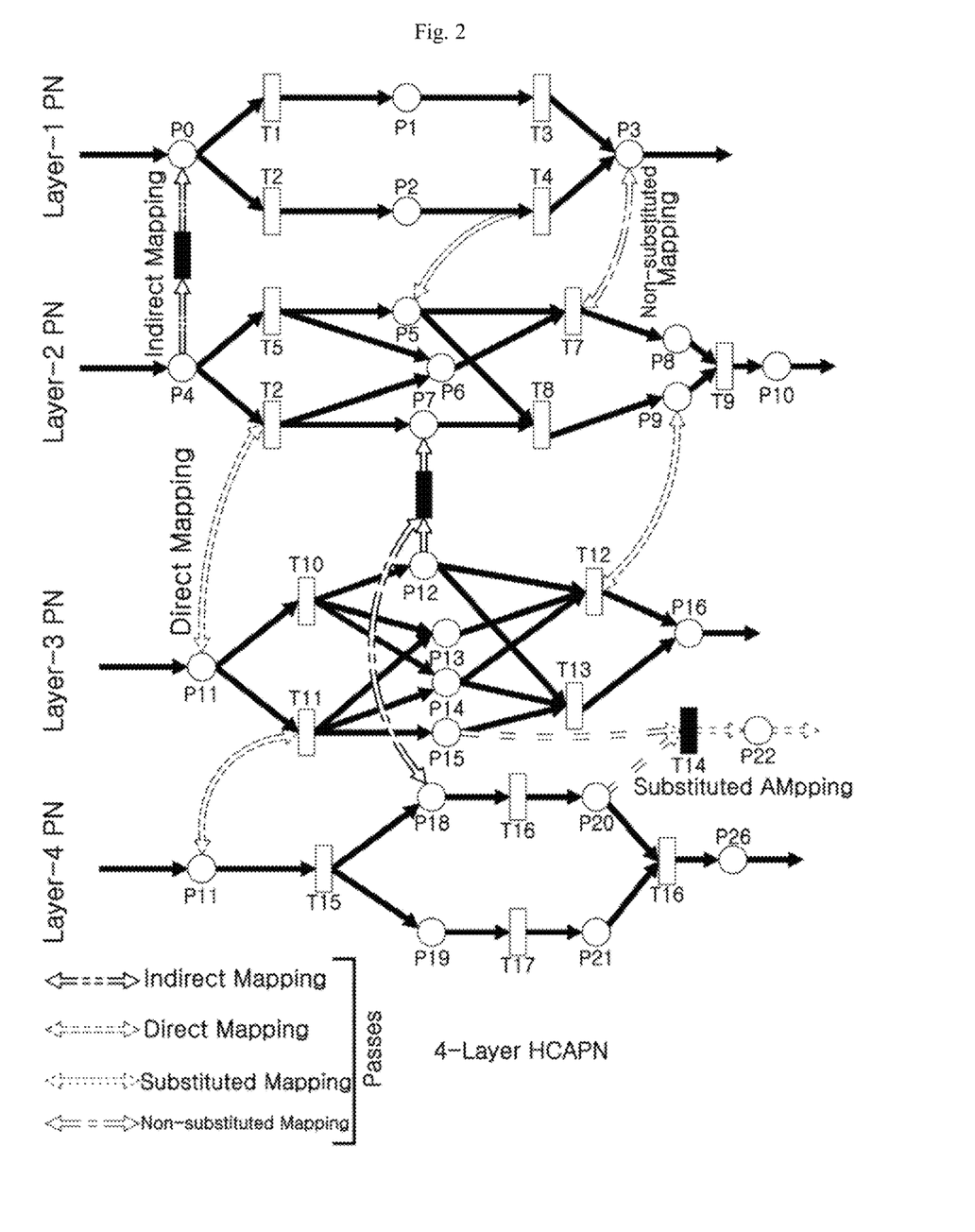
FIG. 2 is a diagram for describing hierarchical type petri net modeling according to an embodiment.

FIG. 2 is a diagram for describing hierarchical type petri net modeling according to an embodiment FIG. 2 illustrates a hierarchical type petri net having four layers, for example. The petri net is a modeling scheme for interpreting the input and output of information, that is, a flow of information, in a system, and may be configured with a place, a transition, a token, a pass, etc.

In drawings subsequent to FIG. 2, the place is indicated as a circle, the transition is indicated as a rectangle, and the pass is indicated as an arrow. Furthermore, in the drawings subsequent to FIG. 2, the place is indicated as P or P', and the transition is indicated as T or T' for clear description.

A pass may be indicated as an arrow, the pass may indicate a connection between places or transitions, and an arrow direction of the pass may mean a progress direction of information. The token may be indicated as a dot, but is not illustrated in the drawings subsequent to FIG. 2, for clear illustration of a petri net.

A transition indicates an accident A condition in which such an accident may occur is stored in a place. If a token moves from any one place to another place via a transition, a transition in this case is fired. Accordingly, information may move from any one place to another place in a system modeled as a petri net.

FIG. 2 specifically illustrates hierarchical context-aware aspect-oriented petri nets (HCAPN). In an embodiment, a behavior of the drone 140 may be analyzed or whether security vulnerability is present in or the drone 140 may be verified using the HCAPN model. The HCAPN is described hereinafter.

"Hierarchical" means a single petri net generally modeled by merging petri nets each modeled in each of a plurality of layers. In FIG. 2, a total of four single petri nets for each layer configured with a Layer-1 PN to a Layer-4 PN are merged to form a single hierarchical type petri net.

Figure 3:
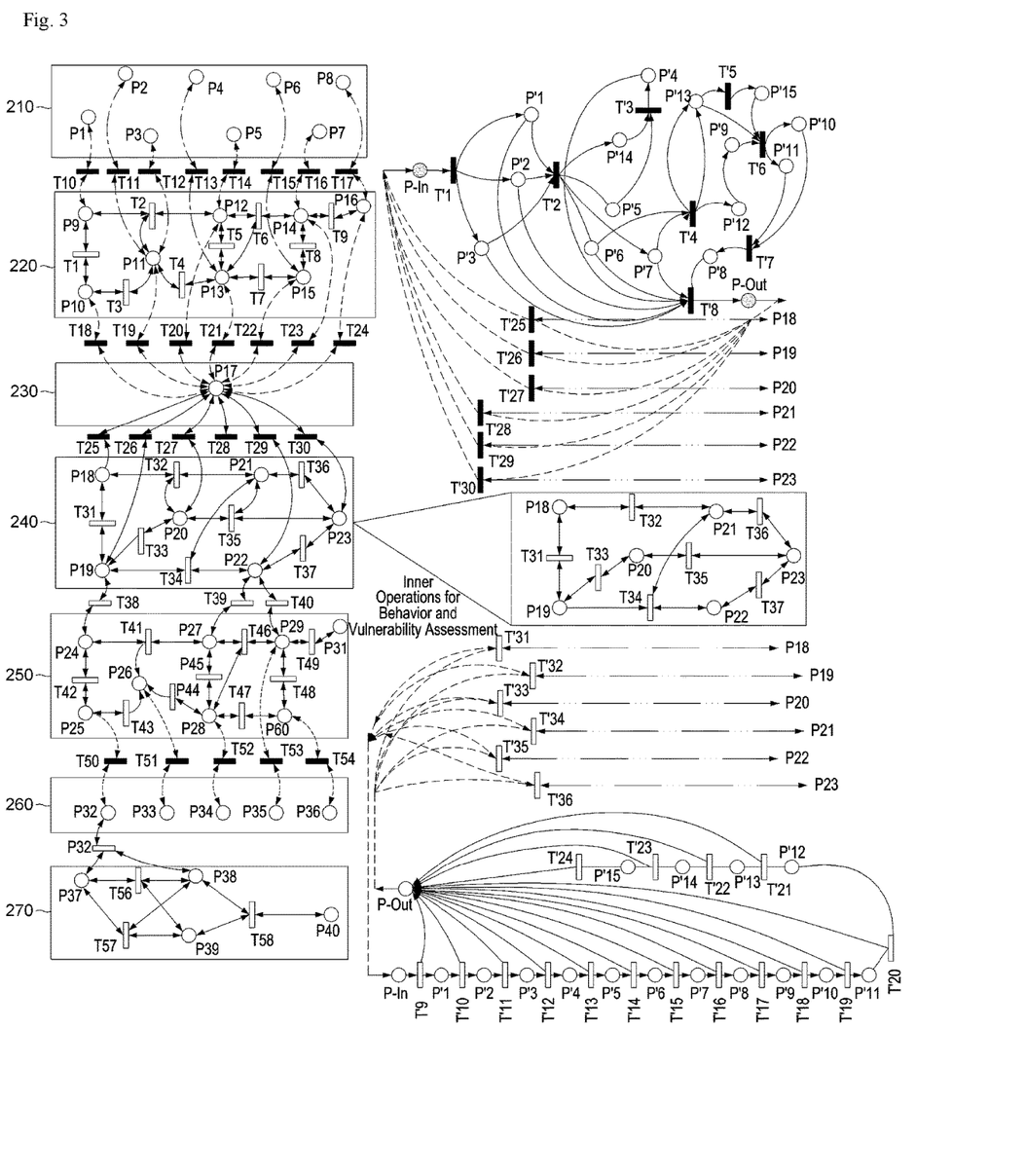
FIG. 3 is a diagram illustrating a hierarchical petri net corresponding to the industrial Internet of things system illustrated in FIG. 1.

In a hierarchical type petri net corresponding to an industrial Internet of things (IIoT) system according to an embodiment, as illustrated in FIG. 3, a total of seven single petri nets for each layer are merged to generally form a single hierarchical type petri net.

In the hierarchical type petri net according to an embodiment, a total number of passes may be $v(v-1)/2$. In this case, v is the sum of places and transition in the hierarchical type petri net. The hierarchical type petri net according to an embodiment may have a much greater number of passes compared to a single petri net.

Such many passes provide a great degree of freedom to the hierarchical type petri net according to an embodiment. Accordingly, many application programs related to the verification of a drone through the hierarchical type petri net can be used. Furthermore, since a flow of information can be smoothly performed due to a great degree of freedom, overhead can be reduced when a system including the hierarchical type petri net operates.

In this case, overhead refers to resources that are indirectly consumed in addition to resources (power, an available apparatus, etc.) directly consumed by the system in order to perform a given mission. If overhead is increased, the waste of the entire system and additional expenses attributable to the waste may occur because unnecessary resources are consumed or used.

In the hierarchical type petri net, a pass is added between the single petri nets due to the merger. To add such a pass may refer to mapping. As illustrated in FIG. 2, mapping may be divided into indirect mapping, direct mapping, substituted mapping, and non-substituted mapping.

Indirect mapping means that a pass to connect a new transition or place if the new transition or place is introduced is added. The new transition or place is not a pass for transferring context information for context-aware, but has been added because the pass needs to be introduced into a petri net.

Direct mapping means that a pass is connected between the existing transitions or places present in a single petri net. Substituted mapping means that the input or output of information occurs due to a new transition or place. Non-substituted mapping means that the input or output of information occurs due to the existing transition or place present in a single petri net.

"Context-aware" means that context (situation information) is input and output to a transition or place along with a token, and a system including a petri net makes a determination based on moving context and rapidly performs the verification of the drone 140, so overhead occurring in the system when the drone 140 is verified can be reduced. In the petri net according to an embodiment, context-aware may be based on the following parameters.

1) Complexity and overhead: the petri net selects a pass that is simple as far as possible and has low overhead when selecting a specific pass.
2) Delay: the petri net selects a pass that does not generate excessive delay when selecting a specific pass.]
3) Reliability: it enables the petri net to have reliability that does not generate redundancy or overlapping when the petri net generates a new transition or pass.
4) Arrival possibility: it enables the petri net to reach results without a loop of passes when adding a new pass.
5) Dependency: it does not generate dependency between two or more transitions or passes when the petri net combines two or more petri nets. 6) Detection ratio: it makes high a detection ratio of a new pass that is simple and has low overhead in the petri net.

"Aspect-oriented" means that a result value is output based on a specific aspect in the hierarchical type petri net according to an embodiment. This may be implemented through specific attributes of a system including the hierarchical type petri net, the context-aware. In an embodiment, for example, the hierarchical type petri net may be operated using whether security vulnerability is present in the drone 140 used in an IIoT system as an aspect.

The HCAPN according to an embodiment may have the following definition and rules according to the contents.

The HCAPN according to an embodiment may be mathematically defined as $H=(P, T, A, Q, E, C, S, L, O)$. P indicates a set of places, T indicates a set of transitions, A indicates a set of an arc between P and T, Q indicates a set of the number of passes, E indicates a set of passes that connect a place and a transition, C indicates a set of content on each arc, S indicates a set having an aspect for each layer, L I indicates the number of layers, and O indicates a set of output places The number of passes of the HCAPN controls a flow of a petri net model and affects the arrival possibility of a system including the petri net. If the number of passes is wrong, excessive overhead occurs, a desired output is not generated, and many resources in a system are wasted because a loop occurs. Accordingly, the HCAPN according to an embodiment may have the following pass rule.

In a given $H=(P, T, A, Q, E, C, S, L, O)$, if $|Q| \leq |P|+|T|$, a possible number of passes is $v(v-1)/2$.

In the HCAPN according to an embodiment, the number of passes includes the number of limited passes and the number of non-limited passes. In this case, for a smooth operation of the HCAPN, possible passes are formed within the range of the number of limited passes. In this case, the number of limited passes is determined as $\Sigma|Pa|-\Sigma|Pb|+1)(|L|-1$, and the number of non-limited passes is given as $(\Sigma|Pa|-\Sigma|Pb|+1)(|L|)(|L|-1)/2$. In this case, $|Pa|$ and $|Pb|$ are the number of passes in two petri nets that are connected.

In the HCAPN according to an embodiment, the number of places and the number of transitions affect the output of the HCAPN. Accordingly, for an accurate and effective output in the HCAPN, the following place and transition rule may be provided.

In the HCAPN according to an embodiment, a transition may be introduced for only indirect mapping. Due to such limitation, the occurrence of a loop in a hierarchical type petri net model can be suppressed, the arrival possibility can be increased, and overhead can be reduced. Accordingly, the sum of the number of places (except an output place) and the number of transitions in the HCAPN except a newly added output place is given as $|P|+|T|+|T'|$. In this case, T' is a set of transitions newly added to connect two or more single petri nets.

If the number of limited passes is used, the number of output places of the HCAPN is given as $|L|+(|L|-1)$. If the number of non-limited passes is used, the number of output places of the HCAPN becomes $|L|+|L|(|L|-1)/2$.

Accordingly, the sum $|H|$ of the number of places and the number of transitions including the output place in the HCAPN is as follows. If the number of limited passes is used, the sum $|H|$ is $|H|=|P|+|T|+|T'|+|L|+(|L|-1)-|L|$, $=|P|+|T|+|T'|-(|L|-1)$. If the number of non-limited passes is used, the sum $|H|$ is $|H|=|P|+|T|+|T'|+|L|+|L|(|L|-1)/2-|L|$, $=|P|+|T|+|T'|+|L|(|L|-1)/2$.

FIG. 3 is a diagram illustrating a hierarchical type petri net corresponding to the IIoT system illustrated in FIG. 1. As illustrated in FIG. 3, the hierarchical type petri net according to an embodiment model includes a first layer 210 to a seventh layer 270. Each of the layers may correspond to a configuration of an IIoT system according to an embodiment.

Specifically, the first layer 210 may be provided as a petri net modeled from the user terminal 110, the second layer 220 may be provided as a petri net modeled from the first access point 120, and the third layer 230 may be provided as petri net modeled from the core 130.

Furthermore, the fourth layer 240 may be provided as a petri net modeled from the drone 140, the fifth layer 250 may be provided as a petri net modeled from the second access point 150, the sixth layer 260 may be provided as a petri net modeled from the first Internet of Thing apparatus 160, and the seventh layer 270 may be provided as a petri net modeled from the second Internet of Thing apparatus 170.

Each of the first layer 210 to the seventh layer 270 is a single petri net. The hierarchical type petri net according to an embodiment is one petri net in which the first layer 210 to the seventh layer 270 are merged. Accordingly, the first layer 210 to the seventh layer 270 are merged through a connection. As illustrated in FIG. 3, adjacent layers may be interconnected by at least one transition.

In this case, a transition that connects the layers is a transition newly added to connect the layers in addition to the existing transition already present in each single petri net that constitutes each layer. That is, a new transition that connects the layers is necessary in order to form the HCAPN according to an embodiment by merging the single petri nets.

Furthermore, as illustrated in FIG. 3, the petri nets constituting the first layer 210 to the seventh layer 270, respectively, may be bidirectionally connected based on at least one transition between adjacent petri nets. That is, a pass that connects two single petri nets may be bidirectionally formed. Accordingly, information may move in both directions of the two single petri nets.

An embodiment relates to a method of verifying the drone 140 included in an industrial Internet of things (IIoT) system using petri net modeling. Specifically, the method of verifying the drone 140 includes determining whether security vulnerability is present in the drone 140. Specifically, the method of verifying the drone 140 may include a modeling step and a verification step.

In the modeling step, the IIoT system may be modeled into a hierarchical type petri net. Some of results modeled into the hierarchical type petri net is the same as that described with reference to FIG. 3, and the remainder of the results is specifically described with reference to FIGS. 4 and 5.

In the verification step, whether security vulnerability is present in the drone 140 may be verified based on a hierarchical type petri net model. To determine whether security vulnerability is present in the drone 140 is to determine whether the drone 140 is controlled according to a preset method. A plurality of determination factors, that is, a criterion for determining whether the drone 140 is controlled may be included in a petri net.

That is, in the verification step, if at least one of the plurality of determination factors included as places in the hierarchical type petri net model determines an operation of the drone 140 to be abnormal, it may be determined that security vulnerability is present in the drone 140.

Figure 4:
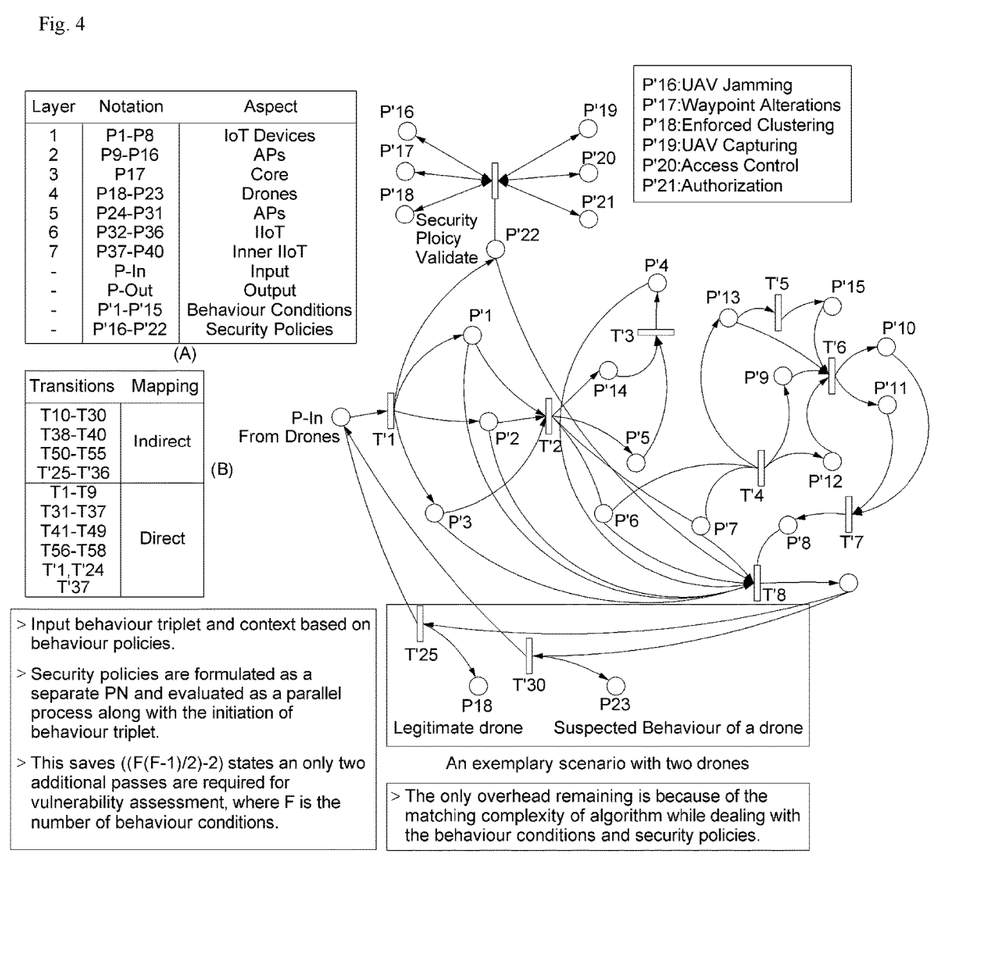
FIG. 4 is a diagram illustrating a hierarchical petri net for determining whether security vulnerability is present in a drone.
Figure 5:
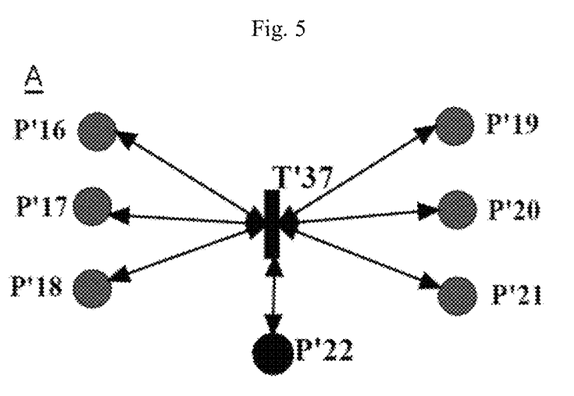
FIG. 5 is a diagram illustrating a portion A in FIG. 4.

FIG. 4 is a diagram illustrating a hierarchical type petri net for determining whether security vulnerability is present in the drone 140. FIG. 5 is a diagram illustrating a portion A in FIG. 4. The plurality of determination factors may be generated as a plurality of places in the fourth layer 240 provided as a petri net modeled from the drone 140 in the hierarchical type petri net.

Places, that is, determination factors, may be provided as a first place P'16 to a sixth place P'21, for example. In this case, as illustrated in FIG. 5, the first place P'16 to the sixth place P'21 may be connected to one main place P'22 through one transition T'37.

If a petri net operates, when the transition T'37 is fired by a token stored in the first place P'16 to the sixth place P'21, a system including the hierarchical type petri net determines that the drone 140 operates abnormally, and thus determines that security vulnerability is present in the drone 140.

Specifically, the first place P'16 determines whether communication or an operation of the drone 140 is hindered by the outside (UAV Jamming). If communication or an operation of the drone 140 is hindered by the outside, the first place P'16 determines the operation of the drone 140 to be abnormal, and thus the transition T'37 is fired.

The second place P'17 determines whether a waypoint on a moving path in which the drone 140 has been set is altered (Waypoint Alterations). If the waypoint on the moving path in which the drone 140 has been set is altered, the second place P'17 determines an operation of the drone 140 to be abnormal, and thus the transition T'37 is fired.

The third place P'18 determines whether a plurality of the drones 140 forms enforced clustering that has not been set (Enforced Clustering). The enforced clustering may mean that a plurality of the drones 140 is enforced at a specific location, that is, artificially clustered to form a group. If the plurality of drones 140 forms enforced clustering that has not been set, the third place P'18 determines an operation of the drone 140 to be abnormal, and thus the transition T'37 is fired.

The fourth place P'19 determines whether the drone 140 has been captured (UAV Capturing). If the drone 140 has been captured, the fourth place P'19 determines an operation of the drone 140 to be abnormal, and thus the transition T'37 is fired.

The fifth place P'20 determines whether access control over the drone 140 is possible (Access Control). Access control may mean that the drone 140 is accessed according to a legally authorized method and controlled, for example. If access control over the drone 140 is impossible, the fifth place P'20 determines an operation of the drone 140 to be abnormal, and thus the transition T'37 is fired.

The sixth place P'21 determines whether the drone 140 has been authorized by the IIoT system (Authorization). If the drone 140 has not been authorized by the IIoT system, the sixth place P'21 determines an operation of the drone 140 to be abnormal, and thus the transition T'37 is fired.

In an embodiment, the transition T'37 may be fired by at least one of the first place P'16 to the sixth place P'21. If the transition T'37 has not been fired by any one of the first place P'16 to the sixth place P'21, this may mean that a system operates only if security vulnerability is not present in the drone 140 and the drone 140 maintains security.

Meanwhile, in an embodiment, whether security vulnerability is present in all or some of a plurality of the drones 140 or in each of plurality of the drones 140 with respect to each place except the third place P'18 may be verified.

In an embodiment, there is an effect in that whether security vulnerability is present in the drone 140 included in the IIoT system can be verified accurately and easily using the hierarchical type petri net model.

If the hierarchical type petri net according to an embodiment model is used, there are effects in that overhead occurring in verifying the drone 140 can be reduced, and thus resource waste and cost waste of a system attributable to excessive overhead can be reduced.

Only some cases have been described above in relation to the embodiment. In addition, implementations having various forms are possible. The technical contents of the aforementioned embodiments may be combined in various forms unless they are incompatible technologies, and thus may be implemented as a new embodiment.

INDUSTRIAL AVAILABILITY

In an embodiment, there is an effect in that whether security vulnerability is present in a drone included in an industrial Internet of things system can be verified accurately and easily using the hierarchical type petri net model.

What is claimed is:

1. A method of verifying a drone included in an industrial Internet of things (IIoT) system using petri net modeling, the method comprising:
    a modeling step of modeling the industrial Internet of things system into a hierarchical type petri net; and
    a verification step of verifying whether security vulnerability is present in the drone based on a hierarchical type petri net model,
    wherein the verification step comprises determining that the security vulnerability is present in the drone when at least one of a plurality of determination factors included as places in the hierarchical type petri net model determines an operation of the drone to be abnormal;
    wherein the IIoT system comprises:
        a user terminal supporting a user;
        a first access point connected to the user terminal;
        a core connected to the first access point and interconnecting the user and an Internet of Things (IoT) apparatus;
        a drone connected to the core in a way to communicate with the core and provided in plural;
        a second access point connected to the drone;
        a first IoT apparatus connected to the second access point and provided to be capable of bidirectional communication with the user; and
        a second IoT apparatus connected to the first IoT apparatus, and
    wherein the hierarchical type petri net model comprises:
        a first layer provided as a petri net modeled from the user terminal;
        a second layer provided as a petri net modeled from the first access point;
        a third layer provided as a petri net modeled from the core;
        a fourth layer provided as a petri net modeled from the drone;
        a fifth layer provided as a petri net modeled from the second access point;
        a sixth layer provided as a petri net modeled from the first IoT apparatus; and
        a seventh layer provided as a petri net modeled from the second IoT apparatus.

2. The method of claim 1, wherein the plurality of determination factors comprises:
    a first place for determining whether communication or an operation of the drone is hindered from an outside;
    a second place for determining whether a waypoint on a moving path in which the drone has been set is altered;
    a third place for determining whether a plurality of the drones forms enforced clustering that has not been set;
    a fourth place for determining whether the drone has been captured;
    a fifth place for determining whether access control over the drone is possible; and
    a sixth place for determining whether the drone has been authorized by the industrial Internet of things system.

3. The method of claim 2, wherein the plurality of determination factors determines an operation of the drone to be abnormal in at least one of cases where communication or the operation of the drone is hindered from the outside, the waypoint on the moving path in which the drone has been set is altered, the plurality of drones forms enforced clustering that has not been set, the drone has been captured, access control over the drone is impossible, and the drone has not been authorized by the industrial Internet of things system.

4. The method of claim 1, wherein layers adjacent to each other in the first layer to the seventh layer are interconnected by at least one transition.

5. The method of claim 1, wherein petri nets constituting the first layer to the seventh layer, respectively, are bidirectionally connected based on at least one transition between adjacent petri nets.

* * * * *